United States Patent [19]

Minagawa et al.

[11] Patent Number: 5,446,849
[45] Date of Patent: Aug. 29, 1995

[54] ELECTRONIC COMPUTER WHICH EXECUTES SQUASH BRANCHING

[75] Inventors: Kenji Minagawa, Urayasu; Takeshi Aikawa, Tokyo; Mitsuo Saito, Yokosuka, all of Japan

[73] Assignee: Kabushiki Kaisha Toshiba, Kawasaki, Japan

[21] Appl. No.: 799,981

[22] Filed: Nov. 29, 1991

[30] Foreign Application Priority Data

Nov. 30, 1990 [JP] Japan .................................. 2-340347
Apr. 5, 1991 [JP] Japan .................................. 3-073273

[51] Int. Cl.6 ............................................ G06F 9/38
[52] U.S. Cl. ................................. 395/375; 395/800; 364/DIG. 1; 364/231.8; 364/232.23; 364/261.3; 364/261.5; 364/263
[58] Field of Search .............. 395/375, 700, 800, 775

[56] References Cited

U.S. PATENT DOCUMENTS

| | | | |
|---|---|---|---|
| 4,463,421 | 7/1984 | Laws | 395/325 |
| 4,777,587 | 10/1988 | Case et al. | 364/DIG. 1 X |
| 5,129,067 | 7/1992 | Johnson | 395/375 |
| 5,136,696 | 8/1992 | Beckwith et al. | 395/375 |
| 5,136,697 | 8/1992 | Johnson | 395/375 |
| 5,150,469 | 9/1992 | Jouppi | 395/375 |
| 5,193,206 | 3/1993 | Mills | 395/800 |
| 5,214,763 | 5/1993 | Blaner et al. | 395/375 |
| 5,265,213 | 11/1993 | Welser et al. | 395/375 |

FOREIGN PATENT DOCUMENTS

| | | |
|---|---|---|
| 0210384 | 2/1987 | European Pat. Off. . |
| 0212129 | 3/1987 | European Pat. Off. . |
| 0368332 | 5/1990 | European Pat. Off. . |
| 4134392 | 4/1992 | Germany . |

OTHER PUBLICATIONS

Lilja, David J., "Reducing the Branch Penalty in Pipelined Processors," Computer, Jul. 1988, pp. 47-55.

IBM J. Res. Develop., vol. 34, No. 1, Jan. 1990, pp. 37-58, G. F. Grohoski, "Machine Organization of the IBM RISC System/6000 Processor".

1989 IEEE International Conference on Computer Design: VLSI in Computers & Processors, Oct. 1989, Piyush Patel, et al., "Architectural Features of the i860(TM)—Microprocessor RISC Core and On-Chip Caches", pp. 385-390.

The 13th Annual International Symposium on Computer Architecture, Jun. 1986, Scott McFarling, et al., "Reducing the Cost of Branches", pp. 396-403.

Primary Examiner—Paul V. Kulik
Attorney, Agent, or Firm—Oblon, Spivak, McClelland, Maier & Neustadt

[57] ABSTRACT

An electronic computer according to this invention is capable of executing a plurality of instructions simultaneously. It is characterized by comprising a flag adding section for judging whether or not each of a plurality of instruction is either a delayed branch instruction or a squash branch instruction, and based on the results, adding a flag indicating an abort condition to each instruction, and a command execute abort section for aborting execution of each instruction on the basis of whether or not the flag added to each instruction to indicate the abort condition and each branch instruction hold true.

7 Claims, 7 Drawing Sheets

| # | F | D | E | M | W | | Condition Abort Flag |
|---|---|---|---|---|---|---|---|
| 1 |   | D | E | M | W |   | alex |
| 2 | F | D | E | M | W | BRANCH COMMAND | alex |
| 3 |   | D | E | M | W |   | alex |
| 4 |   | D | E | M | W |   | brab |
| 5 |   | D | E | M | W |   | brab |
| 6 | F | D | E | M | W |   | brab |
| 7 |   | D | E | M | W |   | brab |
| 8 |   | D | E | M | W |   | brab |
| 9 |   | D | E | M | W |   | brab |
| 10 | F | D | E | M | W |   | brab |
| 11 |   | D | E | M | W |   | brab |
| 12 |   | D | E | M | W |   | brab |
| 13 |   | D | E | M | W | BRANCH DESTINATION COMMAND |   |
| 14 | F | D | E | M | W |   |   |
| 15 |   | D | E | M | W |   |   |
| 16 |   | D | E | M | W |   |   |

FIG. 5

| # | F | D | E | M | W | | Condition Abort Flag |
|---|---|---|---|---|---|---|---|
| 1 |   | D | E | M | W |   | alex |
| 2 | F | D | E | M | W |   | alex |
| 3 |   | D | E | M | W |   | alex |
| 4 |   | D | E | M | W |   | alex |
| 5 |   | D | E | M | W |   | alex |
| 6 | F | D | E | M | W |   | brab |
| 7 |   | D | E | M | W |   | brab |
| 8 |   | D | E | M | W |   | brab |
| 9 |   | D | E | M | W |   | brab |
| 10 | F | D | E | M | W |   | brab |
| 11 |   | D | E | M | W |   | brab |
| 12 |   | D | E | M | W |   | brab |
| 13 |   | D | E | M | W | BRANCH DESTINATION COMMAND |   |
| 14 | F | D | E | M | W |   |   |
| 15 |   | D | E | M | W |   |   |
| 16 |   | D | E | M | W |   |   |

|   |   |   |   |   |   |   |   |           |
|---|---|---|---|---|---|---|---|-----------|
| 1 |   | D | E | M | W |   |   | alex      |
| 2 | F | D | E | M | W |   |   | alex      |
| 3 |   | D | E | M | W |   |   | alex / BRANCH INSTRUCTION |
| 4 |   |   | D | E | M | W |   | alex      |
| 5 |   |   |   | D | E | M | W | brab      |
| 6 |   | F | D | E | M | W |   | brab      |
| 7 |   |   | D | E | M | W |   | brab      |
| 8 |   |   | D | E | M | W |   | brab      |
| 13|   |   |   | D | E | M | W | BRANCH DESTINATION INSTRUCTION |
| 14|   |   | F | D | E | M | W |           |
| 15|   |   |   | D | E | M | W |           |
| 16|   |   |   | D | E | M | W |           |

FIG. 6

CONDITION ABORT FLAG

|   |   |   |   |   |   |   |   |           |
|---|---|---|---|---|---|---|---|-----------|
| 1 |   | D | E | M | W |   |   | alex      |
| 2 | F | D | E | M | W |   |   | alex      |
| 3 |   | D | E | M | W |   |   | brex      |
| 4 |   | D | E | M | W |   |   | brab / BRANCH INSTRUCTION |
| 5 |   |   | D | E | M | W |   | brab      |
| 6 |   | F | D | E | M | W |   | brab      |
| 7 |   |   | D | E | M | W |   | brab      |
| 8 |   |   | D | E | M | W |   | brab      |
| 9 |   |   |   | D | E | M | W | brab      |
| 10|   | F |   | D | E | M | W | brab      |
| 11|   |   |   | D | E | M | W | brab      |
| 12|   |   |   | D | E | M | W | brab      |
| 13|   |   |   | D | E | M | W | BRANCH DESTINATION INSTRUCTION |
| 14|   |   | F | D | E | M | W |           |
| 15|   |   |   | D | E | M | W |           |
| 16|   |   |   | D | E | M | W |           |

ELECTRONIC COMPUTER WHICH EXECUTES SQUASH BRANCHING

BACKGROUND OF THE INVENTION

1. Field of the Invention

This invention relates to an improved electronic computer, and more particularly to an electronic computer capable of executing a plurality of instructions simultaneously and to an electronic computer capable of supporting a plurality of bus protocols.

2. Description of the Related Art

RISC processors capable of executing instructions at high speeds have been used for parallel arithmetic operation that deals with a plurality of instructions at the same time. Recently, much faster super-scalar processors have been developed; one of commercialized models of this type is Intel's 80960CA.

RISC processors are rich in software resources available. In developing super-scalar processors, to make full use of the existing software, it is necessary to develop processors that have object compatibility with the existing software.

Some of RISC processors use delayed branching or squashed branching techniques in order to reduce losses due to wasteful actions in executing branch instructions. Typical processors of this type are Sun Microsystems' R2000 and R3000. In delayed branching, when a branch instruction is encountered, the instruction immediately after the branch instruction is executed and then the branch destination instruction is executed. In squash branching, when a branch instruction is encountered, in the case of a branch-not-taken mode, the instruction next to the branch instruction is not executed, but the next instruction is executed, while in the case of a branch-taken mode, the instruction next to the branch instruction is executed and then the branch destination instruction is executed.

Because super-scalar processors are fast in executing instructions but complex in control, it is difficult to directly execute the object codes of RISC machines using the above-described delayed branching or squash branching technique. As a consequence, super-scalar processors have no object compatibility with programs for RISC processors that perform delayed branch instructions or squash branch instructions.

For example, the Intel super-scalar processor 80960CA has object compatibility with the Intel's RISC processor 80960KA. However, at present, the 80960KA has not used delayed branching or squash branching techniques.

As noted above, super-scalar processors, which have recently been developed in place of RISC processors, cannot execute delayed branch or squash branch instructions as matters stand. Therefore, they have no object compatibility with programs for RISC processors capable of executing those types of branch instructions.

In a multiprocessor system having a plurality of processors, there is a time when communication between processors coexists with data communication between a processor and other peripheral units. In this case, the protocol of data transfer procedure for each communication is different from the other. Thus, to achieve those two types of communication, it is necessary to actively switch bus protocols depending on the communication mode used.

However, for a system where processor-to-processor communication and processor-to-peripheral communication coexist, an effective means has not yet been found which switches bus protocols according to mode to allow those two types of communications on the same system.

Some electronic computers employ a copy-back virtual cache system. In such computers, such as the SUN workstation, the cache tag of the cache memory is provided with a dirty bit and the TLB (address translation buffer) is assigned a dirty page bit. Those computers have a hardware mechanism that asserts the dirty bit of the cache tag when data is stored in the cache memory, and that copies into the TLB dirty page bit the dirty bit of the cache line to be copied back when copy back occurs, which action indicates that data has been written into the page. By the above operation, the hardware mechanism rewrites the TLB dirty page bit at the time of uncached write access.

However, computers with a virtual cache system rewrite the TLB dirty page bit by means of hardware, which results in more complicated hardware construction, larger LSI chip size, and longer development time.

Among related literature are "IBM RISC System 1600 Technology," 1990, IBM Corporation, and "80960 Users' Manual," Intel Corporation.

SUMMARY OF THE INVENTION

An object of the present invention is to provide an electronic computer having a super-scalar processor capable of executing both delayed branch instructions and squash branch instructions and achieving object compatibility with RISC processor programs.

The object is accomplished by providing an electronic computer capable of executing a plurality of instructions simultaneously, comprising: fetching means for accessing an instruction cache memory to fetch a plurality of instructions; latching means for latching the output of the fetching means; a command supplying unit for receiving the latched instructions from the latching means; abort condition synthesizing means for judging whether or not each of a plurality of instructions is either a delayed branch instruction or a squash branch instruction, and based on the results, adding to each instruction a flag indicating an abort condition; and a plurality of executing means for receiving the instructions from the command supplying unit and the abort condition synthesizing means and performing processes according to the instructions, each of the executing means including command execute abort means for aborting execution of each of the instructions on the basis of whether or not the flag added to each instruction to indicate the abort condition and the branch instruction hold true.

With this electronic computer, it is possible to abort the execution of each instruction using a delayed branch instruction or a squash branch instruction on the basis of whether or not the abort condition flag added to each instruction and the branch instruction hold true. Therefore, even in super-scalar processors, both delayed branch instructions and squash branch instructions can be executed, which provides object compatibility with RISC processor programs having a great variety of software resources. Making effective use of abundant software resources allows high speed processing.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Referring to the accompanying drawings, embodiments of the present invention will be explained.

Figure 1:
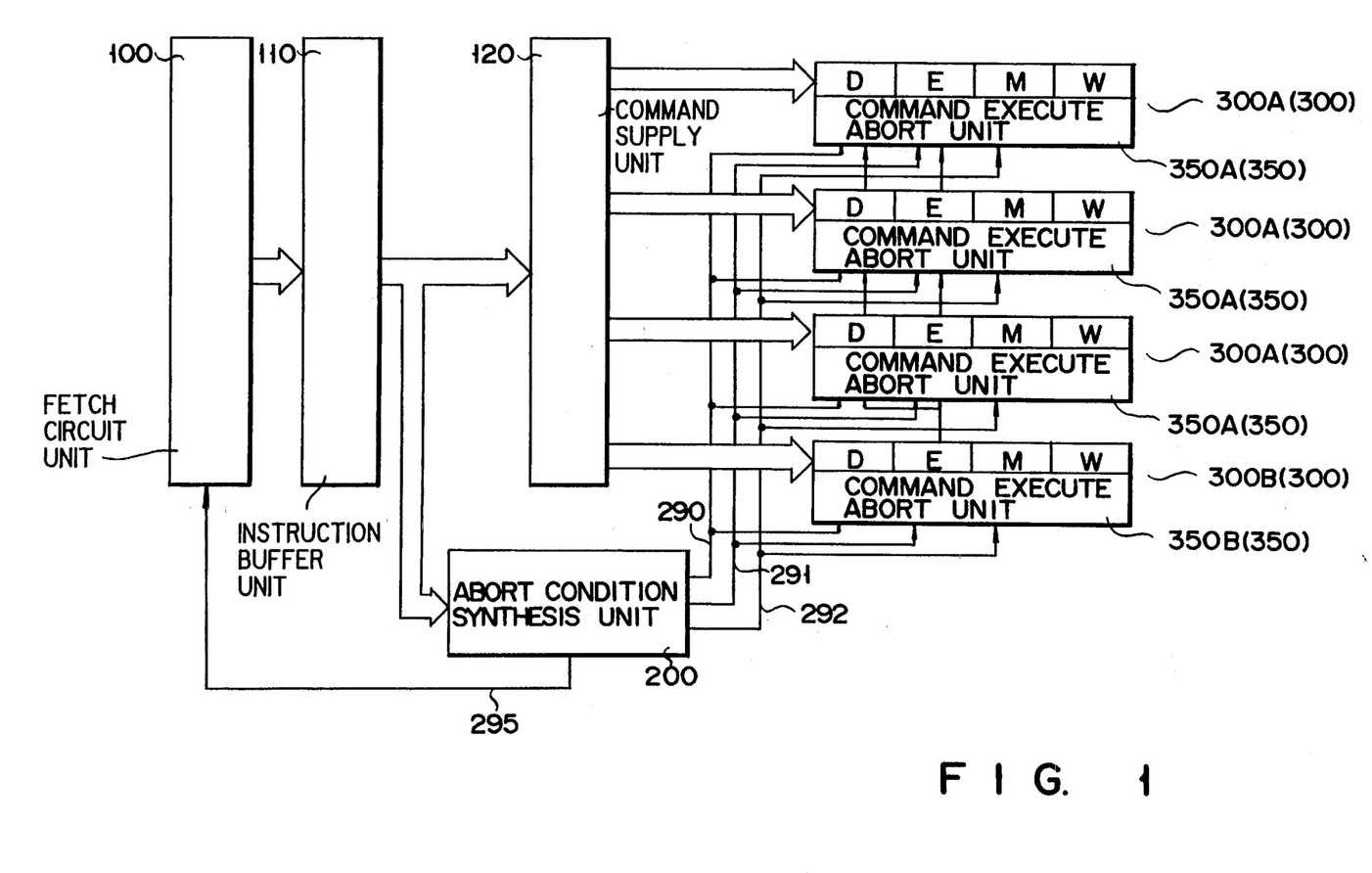
FIG. 1 is a block diagram showing the overall construction of an electronic computer according to a first embodiment, associated with the first object, of the present invention.

FIG. 1 is a block diagram of a 5-stage pipeline 4-instruction simultaneous-execution super-scalar machine which is an electronic computer according a first embodiment, associated with the first object, of the present invention. In FIG. 1, the pipeline consists of a fetch stage, a decode stage (D), an execute stage (E), a memory access stage (M), and a write stage (w).

In the figure, a fetch circuit unit 100 accesses an instruction cache memory (not shown) to fetch a plurality of instructions.

Those instructions stored in the fetch circuit unit 100 are sent to an instruction buffer unit 110 that latches them. The latched instructions in the instruction buffer unit 110 are sent to a command supply unit 120 as well as an abort condition synthesis unit 200.

The command supply unit 120 supplies the instructions to individual execute units 300A and a branch execute unit 300B. The execute unit 300A is made up of a decode stage (D), an execute stage (E), a memory access stage (M), a write stage (W), and a command execute abort unit 350A.

The abort condition synthesis unit 200, which will be explained in detail later, is a unit that generates conditional abort flags for the execute units 300A and 300B and fetch circuit unit 100. Specifically, it supplies a D-stage condition abort signal 291 and an E-stage condition abort signal 292 to the execute units 300A and branch execute unit 300B and an F-stage condition abort signal 295 to the fetch circuit unit 100.

Figure 2:
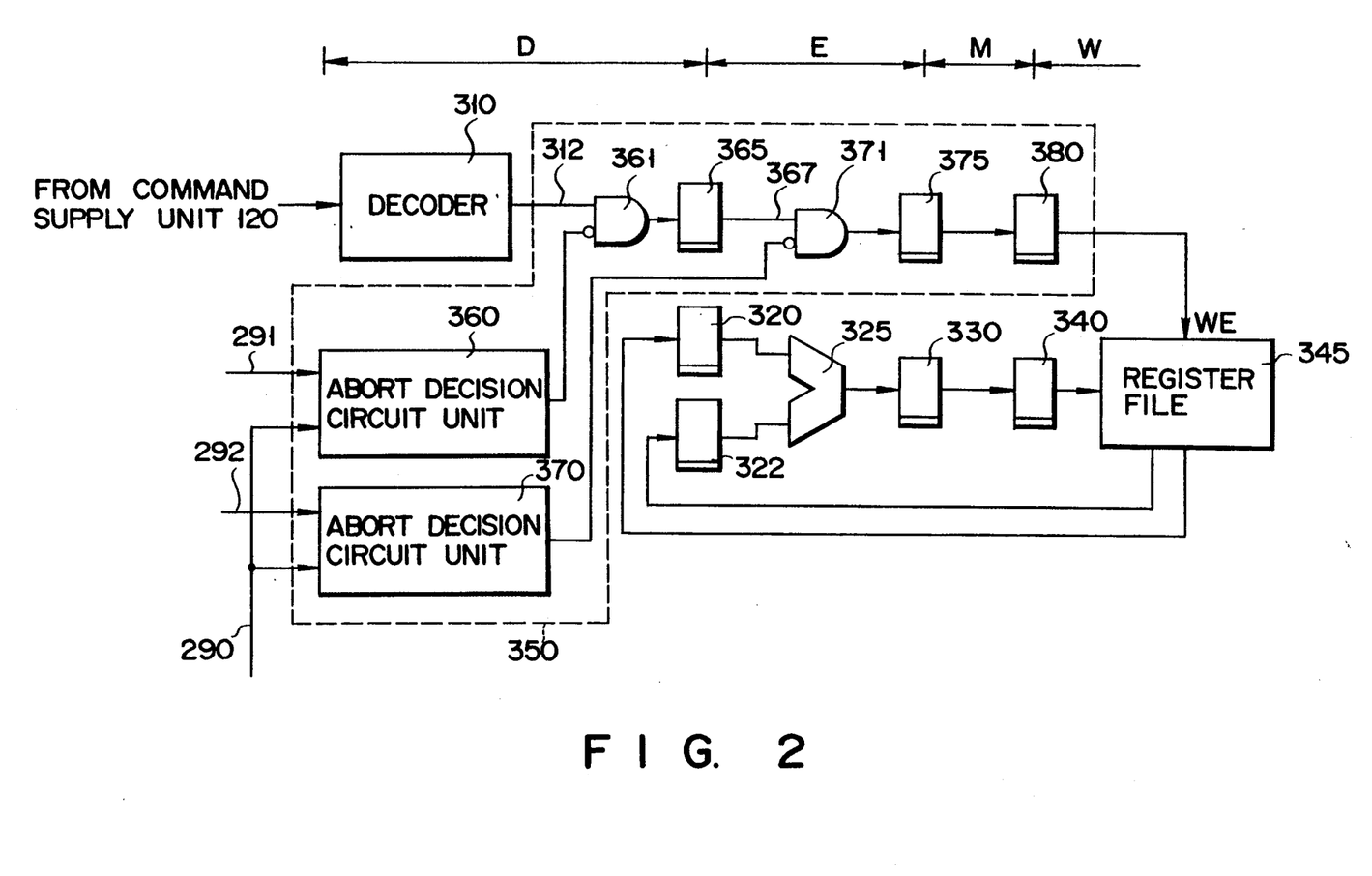
FIG. 2 is a block diagram for the execute unit of FIG. 1.

FIG. 2 shows a practical arrangement of the execute units 300A and 300B. Because the execute units 300A and 300B have the same circuit configuration, they will be referred to as the execute unit 300.

In FIG. 2, the instructions supplied from the command supply unit 120 are sent to a D-stage decoder 310. The decoder 310 decodes the instructions from the command supply unit 120 to produce a D-stage valid signal 312. The valid signal 312 is supplied to one input terminal of an E-stage AND circuit 361.

Depending on the contents of the output from an abort decision circuit unit 360 supplied to the other input terminal, the AND circuit 361 can negate the valid signal 312.

The abort decision circuit unit 360 makes an abort decision depending on the relation between the D-stage condition abort signal 291 latched in a latch 221 and a branch-taken signal 290 indicating whether to branch or not.

The output of the AND circuit 361 is latched in an E-stage latch 365 and sent as an E-stage valid signal 367 to one input terminal of an AND circuit 371. Depending on the contents of the output from an abort decision circuit 370 supplied to the other input terminal, the AND circuit 371 can negate an E-stage valid signal 367.

The abort decision circuit 370, like the aforementioned abort decision circuit 360, makes an abort decision depending on the E-stage condition abort signal 292 latched in a latch 223 and a branch-taken signal 290 indicating whether to branch or not.

The output of the AND circuit 371 is supplied as a write enable signal EW to a register file 345 via an M-stage latch 375 and a W-stage latch 380.

The command execute abort unit 350 is composed of the abort decision circuit units 360 and 370, AND circuits 361 and 371, and latches 365, 375, and 380.

The contents of the output of the register file 345 are supplied to an arithmetic unit 325 via the E-stage latches 320 and 322 and are calculated in the arithmetic unit 325. The calculation results are written into the register file 345 again via the M-stage latch 330 and W-stage latch 340.

Figure 3:
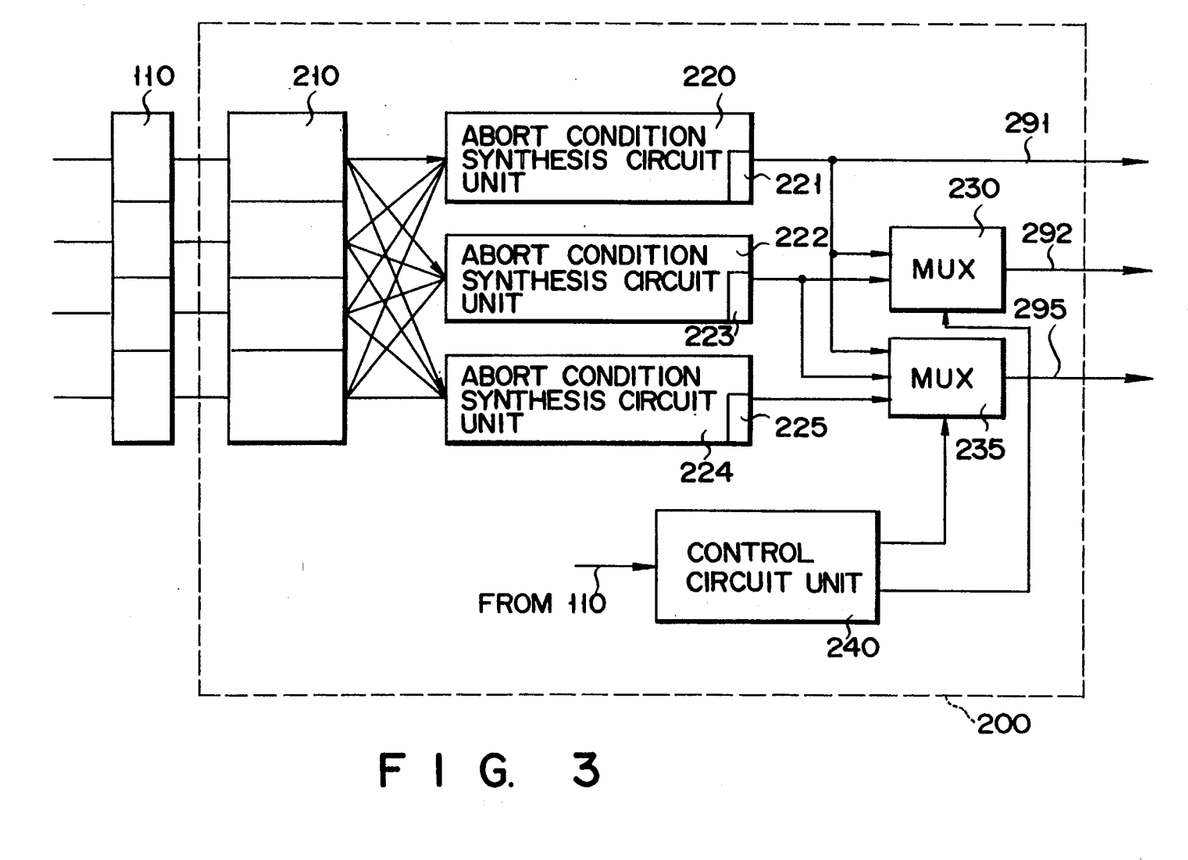
FIG. 3 is a block diagram for the abort condition synthesis unit of FIG. 1.

FIG. 3 illustrates a practical configuration of the abort condition synthesis circuit unit 200.

In FIG. 3, a plurality of instructions (four in this case) latched in the instruction buffer unit 110 are sent to a branch instruction decoder 210.

The branch instruction decoder 210 decodes the instructions from the instruction buffer unit 110 to judge whether it is a delayed branch instruction, squash branch instruction, or another instruction.

The decision at the branch instruction decoder 210 is sent to each of abort condition synthesis circuit units 220, 222, and 224.

The abort condition synthesis circuit unit 220 produces abort conditions regarding a series of four instructions including a branch instruction. The abort condition synthesis circuit unit 222 produces abort conditions regarding a subsequent series of four instructions. The abort condition synthesis circuit unit 224 produces abort conditions regarding another subsequent series of four instructions.

The output of the abort condition synthesis circuit unit 220 is supplied as an D-stage condition abort signal 291, and at the same time, can be supplied as an E-stage condition abort signal 292 via the multiplexer 230, and as an F-stage condition abort signal 295 via the multiplexer 235. The output of the abort condition synthesis circuit unit 222 can be supplied as an E-stage condition abort signal 292 via the multiplexer 230, and as an F-stage condition abort signal 295 via the multiplexer 235. The output of the abort condition synthesis circuit unit 224 can be supplied as an F-stage condition abort signal 295 via the multiplexer 235.

In this case, the multiplexers 230 and 235 are controlled by the control circuit 240 according to a signal indicating that a fetch has been done. The control algorithm of the multiplexers 230 and 235 is as follows:

1) D-stage condition abort signal 291: the condition abort flag for a series of four instructions including a branch instruction generated at the abort condition synthesis circuit unit 220 is supplied as it is.

2) E-stage condition abort signal 292: when no fetch has been made during branch judgment (the time from when a branch instruction is decoded at D stage until execution is completed at E stage), the condition abort flag for a series of four instructions including a branch instruction generated at the abort condition synthesis circuit unit 220 is supplied via the multiplexer 230; and when one fetch has been made during branch judgment, the condition abort flag generated at the abort condition synthesis circuit 222 for a subsequent series of four instructions is supplied via multiplexer 230.

3) F-stage condition abort signal 295: when no fetch has been made during branch judgment, the condition abort flag for a series of four instructions including a branch instruction generated at the abort condition synthesis circuit unit 220 is supplied via the multiplexer 235; when one fetch has been made during branch judgment, the condition abort flag generated at the abort condition synthesis circuit unit 222 for a subsequent series of four instructions is supplied via multiplexer 235; and when two fetches have been made during branch judgment, the condition abort flag generated at the abort condition synthesis circuit unit 224 for another subsequent series of four instructions is supplied via multiplexer 235.

For each of the delayed branching method and squash branching method, operation will be explained below.

First, how a delayed branch instruction is executed in the delayed branch method will be described.

For example, a condition abort flag is generated by the abort condition synthesis circuit 200 which analyzes instructions and generates flags on the basis of the analysis results, using a delayed branch instruction as follows:

| Step | Assembler Code | Condition Abort Flag |
|------|----------------|----------------------|
| 1 | addi r1, r 0, 1 | alex |
| 2 | addi r2, r 0, 2 | alex |
| 3 | addi r3, r 0, 3 | alex |
| 4 | beq r29, r 20, x1 | alex |
| 5 | addi r4 r 0, 4 | alex |
| 6 | addi r5 r 0, 5 | brab |
| 7 | addi r6 r 0, 6 | brab |

-continued

| Step | Assembler Code | Condition Abort Flag |
|------|----------------|----------------------|
| 8 | addi r7 r 0, 7 | brab |
| 9 | addi r8 r 0, 8 | brab |
| 10 | addi r10, r 0, 10 | brab |

As listed above, a condition abort flag alex (always execute) is added to the instructions at steps 1 to 3. When a delayed branch instruction beq is encountered at step 4, the condition abort flag alex will still be added to The delay instructions at steps 4 and 5. To the instructions at step 6 and later, a condition abort flag brab (branch then abort) is added. Therefore, when a delayed branch instruction beq is encountered, then the branch destination instruction will be executed after the instruction at the next step is executed.

Figure 4:
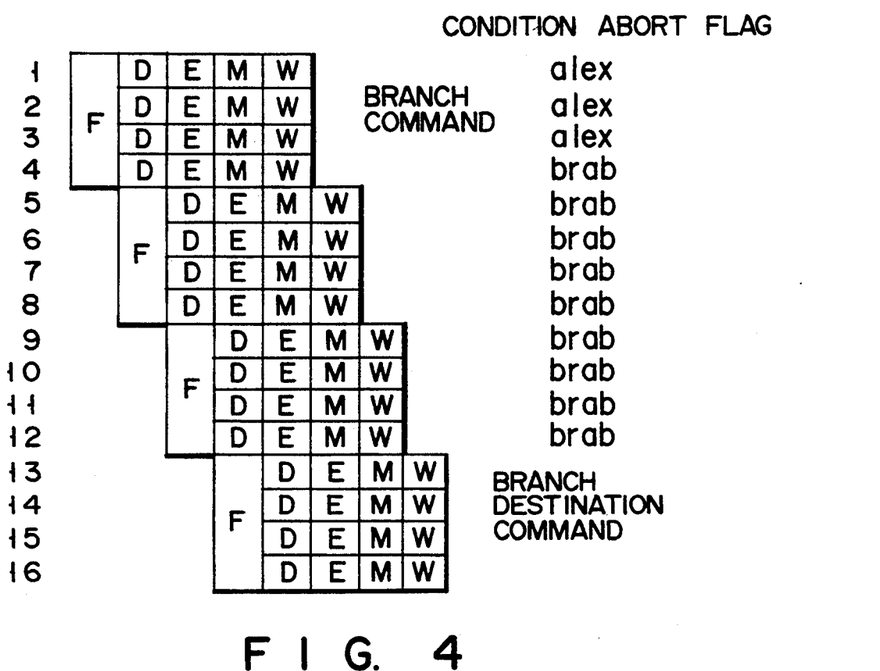
FIG. 4 shows a first way of executing a delayed branch instruction.

FIG. 4 illustrates a first way of executing when a delayed branch instruction is processed in the super-scalar machine.

Among the consecutive instructions, instruction 2 is a branch instruction, instruction 13 is a branch destination instruction, and instruction 3 is a delay instruction. The condition abort flags for instructions 1 to 3 are alex (always execute) and those for instructions 4 to 12 are brab (branch then abort).

A plurality of instructions fetched by the fetch circuit unit 100 are latched at the instruction buffer unit 110, and at the same time, are supplied to the command supply unit 120 and abort condition synthesis unit 200.

In the abort condition synthesis unit 200, the branch instruction decoder 210 decodes a plurality of instructions to judge whether or not instruction 2 is a delayed branch instruction. The result is sent to the abort condition synthesis units 220, 222, and 224.

The abort condition synthesis circuit unit 220 produces the condition abort flag for instructions 1 to 4 as abort conditions regarding a series of four instructions including a branch instruction. The abort condition synthesis circuit unit 222 produces the condition abort flag for instructions 5 to 8 as abort conditions regarding a subsequent series of four instructions. The abort condition synthesis circuit unit 224 produces the condition abort flag for instructions 9 to 12 as abort conditions regarding another subsequent series of four instructions.

The abort flag for instructions 1 to 4 produced at the abort condition synthesis circuit unit 220 is supplied as a D-stage condition abort signal 291 to the first-stage pipeline. The abort flag for instructions 5 to 8 produced at the abort condition synthesis circuit unit 222 is supplied as a D-stage condition abort signal 292 to the second-stage pipeline via the multiplexer 230. The abort flag for instructions 8 to 12 produced at the abort condition synthesis Circuit unit 224 is supplied as an F-stage condition abort signal 295 to the third-stage pipeline via the multiplexer 235.

When the instruction buffer unit 110 supplies a plurality of instructions to the command supply unit 120, the command supply unit 120 sends instructions to the individual execute units 300.

In each execute unit 300, the D-stage decoder 310 decodes instructions, While a D-stage valid signal 312 is supplied to the D-stage AND circuit 361 and an E-stage valid signal 367 to the E-stage AND circuit 371.

In the execute unit 300 corresponding to instruction 1, the abort flag for the E-stage condition abort signal 292 is alex (always execute). In this case, the branch-taken signal 290 indicates "don't branch", so that the output of the abort decision circuit unit 370 is supplied to the AND circuit 371, which passes the E-stage valid signal 367 as it is. The output of the AND circuit 371 is supplied as a write enable signal to the register file 345. Based on the contents of the register file 345, the E-stage arithmetic unit 325 performs calculations.

As with instruction 1, in the execute unit 300 corresponding to instruction 2 of a branch instruction, the abort flag is alex (always execute). Here, the branch-taken signal 290 indicates "don't branch", so that calculation is performed at E stage as mentioned above.

In the execute unit 300 corresponding to instruction 3 of a delay instruction, the abort flag is also alex (always execute). Because the branch-taken signal 290 here indicates "don't branch", calculation is performed at E stage as described above.

In the execute unit 300 corresponding to instruction 4, the abort flag is brab (branch then abort). In this case, the branch-taken signal 290 indicates "branch", so that the AND circuit 371 negates the E-stage valid signal 367 according to the output of the abort decision circuit unit 370, thereby aborting the execution of instruction.

For instructions 5 to 8, like instructions 1 to 4, each execute unit 300 performs abort operation on the basis of the abort flag of the D-stage condition abort signal 291 and the branch-taken signal 290. For instructions 9 to 12, each execute unit 300 still carries out an abort operation on the basis of the abort flag of the F-stage condition abort signal 295 and the branch-taken signal 290. In this way, a delayed branch instruction can be executed by the super-scalar machine.

Figure 5:
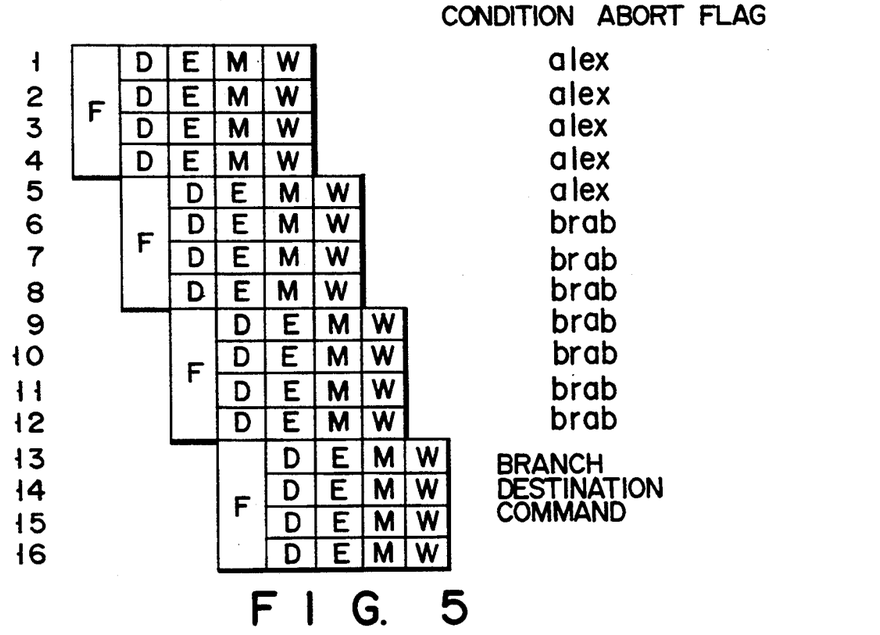
FIG. 5 illustrates a second way of executing a delayed branch instruction.

FIG. 5 illustrates a second way of executing a delayed branch instruction in the super-scalar machine.

In FIG. 5, of the consecutive instructions, instruction 4 is a branch instruction, instruction 13 is a branch destination instruction, and instruction 5 is a delay instruction. The condition abort flags for instructions 1 to 5 are alex (always execute) and those for instructions 6 to 12 are brab (branch and abort).

The operation as shown in FIG. 5 also allows the super-scalar machine to execute a delayed branch instruction as described in the first way.

Figure 6:
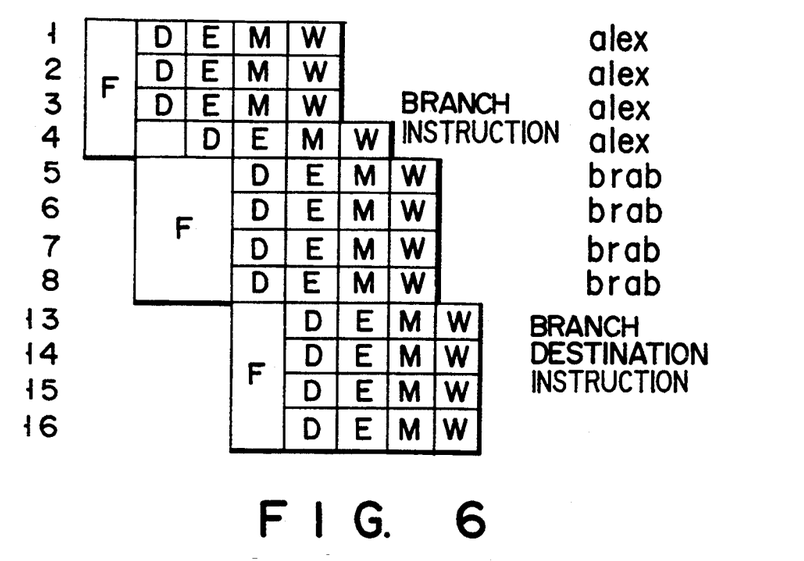
FIG. 6 depicts a third way of executing a delayed branch command.

FIG. 6 shows a third way of executing a delayed branch instruction in the super-scalar machine.

In FIG. 6, among a series of instruction, instruction 3 is a branch instruction, instruction 13 is a branch destination instruction, and instruction 4 is a delay instruction. The condition abort flags for instructions 1 to 4 are alex (always execute) and those for instruction 5 to 12 are brab (branch then abort). Here, because instructions 3 and 4 are interdependent, instruction 4 is executed with a delay of one cycle, though instruction 3 is a branch instruction.

The abort flag produced at the abort condition synthesis unit 220 is supplied as a D-stage condition abort signal 291, and at the same time, is supplied as an E-stage condition abort signal 292 via the multiplexer 230. The abort flag produced at the abort condition synthesis unit 222 is supplied as an F-stage condition abort signal 295 via the multiplexer 235.

With this approach, the super-scaler machine can execute delayed branch instructions as with the first operational example.

Next, how a squash branch instruction is executed in a squash branching method will be explained.

In this method, for example, execution sequence of assembler codes using delayed branch instructions is given as follows:

| Step | Assembler Code | Condition Abort Flag |
| --- | --- | --- |
| 1 | addi r1, r 0, 1 | alex |
| 2 | addi r2, r 0, 2 | alex |
| 3 | addi r3, r 0, 3 | alex |
| 4 | sbeq r29, r 20, x1 | alex |
| 5 | addi r4 r 0, 4 | brex |
| 6 | addi r5 r 0, 5 | brab |
| 7 | addi r6 r 0, 6 | brab |
| 8 | addi r7 r 0, 7 | brab |
| 9 | addi r8 r 0, 8 | brab |
| 10 | addi r10, r 0, 10 | brab |

In this method, a condition abort flag alex (always execute) is added to the instructions at steps 1 to 3. When a squash branch instruction is encountered at step 4, then a condition abort flag brex (branch then execute) will be added at step 5. To the instruction at step 6, a condition abort flag brab (branch abort is added. When a squash branch instruction sbeq is encountered, in the case of a branch-not-taken mode, the instruction next to the branch instruction is not executed, but the next instruction is executed, whereas in the case of a branch-taken mode, the instruction next to the branch instruction is executed and then the branch destination instruction is executed.

Figure 7:
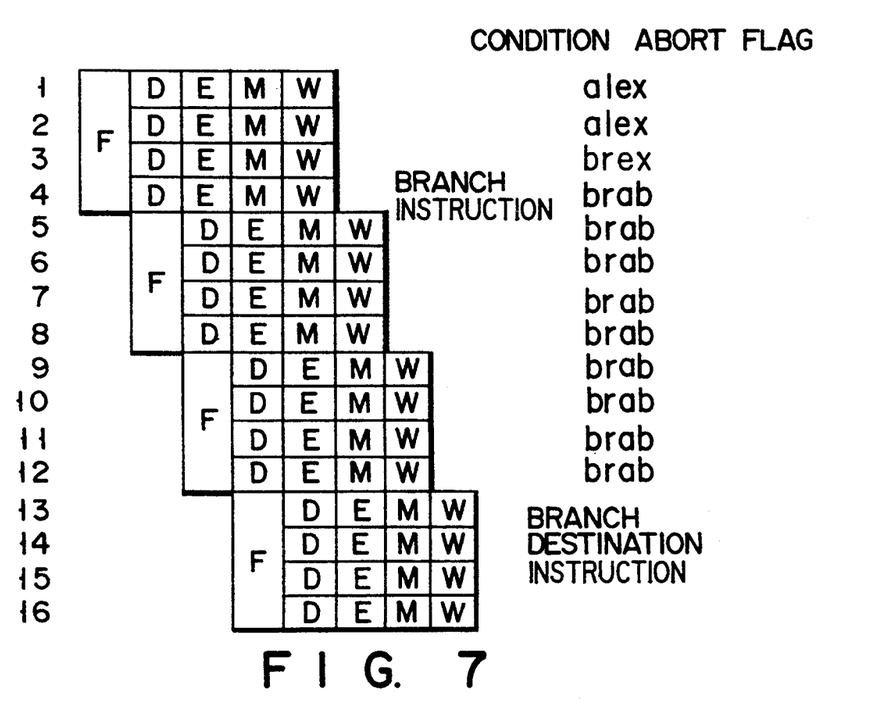
FIG. 7 illustrates how a squash branch instruction is practically executed.

FIG. 7 illustrates how a squash branch instruction is practically executed in the super-scalar machine.

In FIG. 7, among a series of instructions, instruction 2 is a squash branch instruction, instruction 13 is a branch destination instruction, and instruction 3 is a delay instruction. The condition abort flags for instructions 1 to 2 are alex (always execute), that for instruction 3 is brex (branch then execute), and those for instructions 4 to 12 are brab (branch then abort).

In the execute units 300 corresponding to instruction 1 and squash branch instruction 2, the abort flag for the E-stage condition abort signal 292 is alex (always execute) for either case. In this case, the branch-taken signal 290 indicates "don't branch", so that based on the output of the abort decision circuit unit 370, the AND circuit 371 passes the E-stage valid signal 367 as it is. This output is supplied as a write enable signal to the register file 345. Based on the contents of the register file 345, the E-stage arithmetic unit 325 performs calculations.

In the execute unit 300 corresponding to instruction 3, the abort flag is brex (branch then execute). When the branch-taken signal 290 indicates "branch not taken" meaning "don't branch," instruction 3 will not be executed and control proceeds to instruction 4 and later. In contrast, when the branch-taken signal 290 indicates "branch taken" meaning "branch," instruction 3 will be executed and then control will proceed to instruction 4.

In the execute unit 300 corresponding to instruction 4, the abort flag is brab (branch and abort). In this case, the branch-taken signal 290 indicates "branch", so that the AND circuit 371 negates the E-stage valid signal 367 according to the output of the corresponding abort decision circuit unit 370, thereby aborting the execution of instruction.

For instructions 5 to 8, like instructions 1 to 4, each execute unit 300 performs abort operation on the basis of the abort flag of the D-stage condition abort signal 291 and the branch-taken signal 290. Similarly, for instructions 9 to 12, each execute unit 300 carries out abort operation on the basis of the abort flag of the F-stage condition abort signal 295 and the branch-taken signal 290. In this way, a squash branch instruction can be executed by the super-scalar machine.

Figure 8:
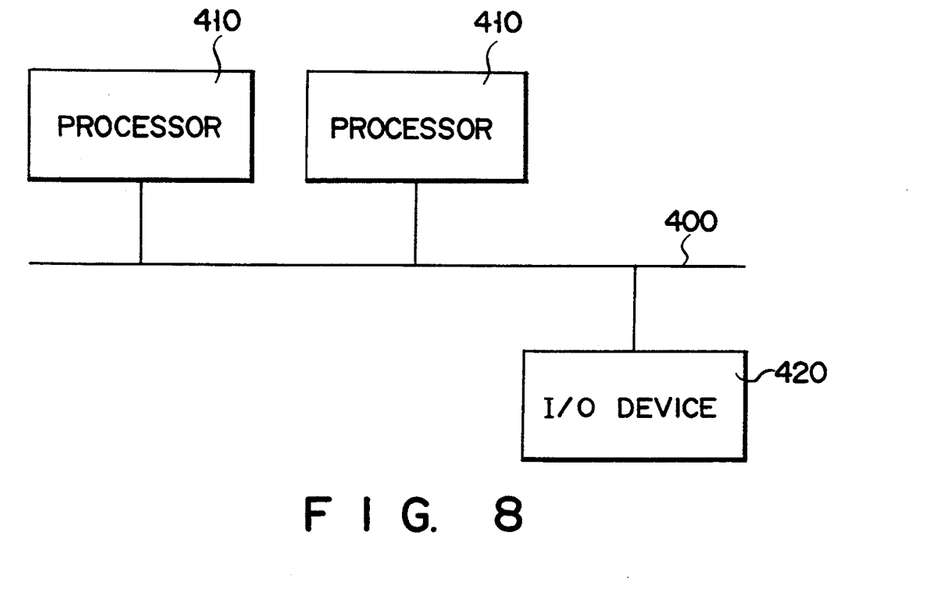
FIG. 8 is a schematic block diagram for a multiprocessor system where processor-to-processor communication and processor-to-I/O unit communication coexist according to a second embodiment, associated with the second object, of the present invention.

FIG. 8 shows a multiprocessor system, where processor-to-processor communication and processor-to-I/O unit communication coexist, according to a second embodiment, associated with the second object, of the present invention.

In FIG. 8, a plurality of processors 410 and I/O units 420 such as a keyboard are connected to a bus 400.

In the figure, high-speed communication between the processors 410 is performed in an address data multiplex mode in which burst transfer based on, for example, PLL synchronization is used. The I/O units 420 often operate at relatively low speeds as represented by a keyboard, so that a data non-multiplex mode is used which allows low-speed operation and a simple hardware configuration.

Figure 9:
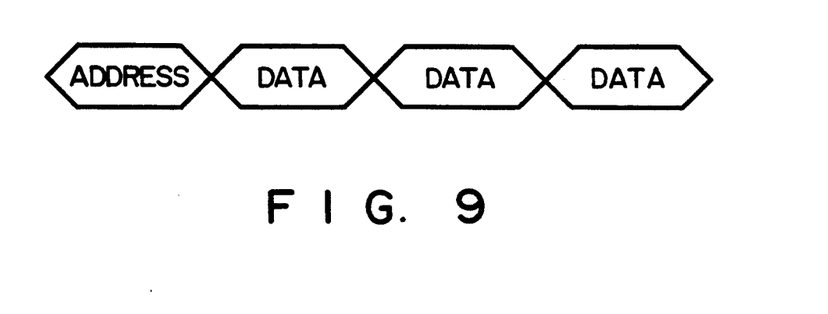
FIG. 9 illustrates an address data multiplex protocol.
Figure 10:
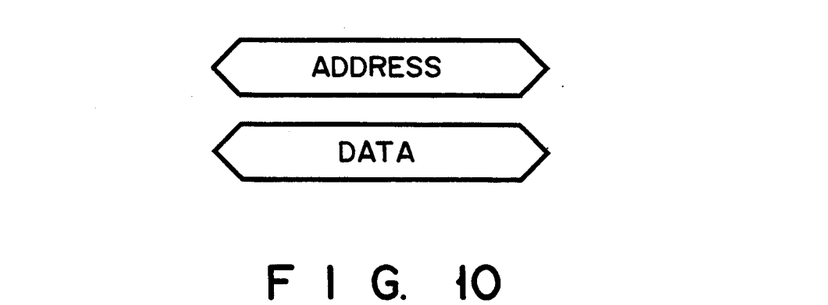
FIG. 10 depicts an address data non-multiplex protocol.

An address data multiplex protocol in the address data multiplex mode is shown in FIG. 9, and an address data non-multiplex protocol in the address data non-multiplex mode is shown in FIG. 10.

Figure 11:
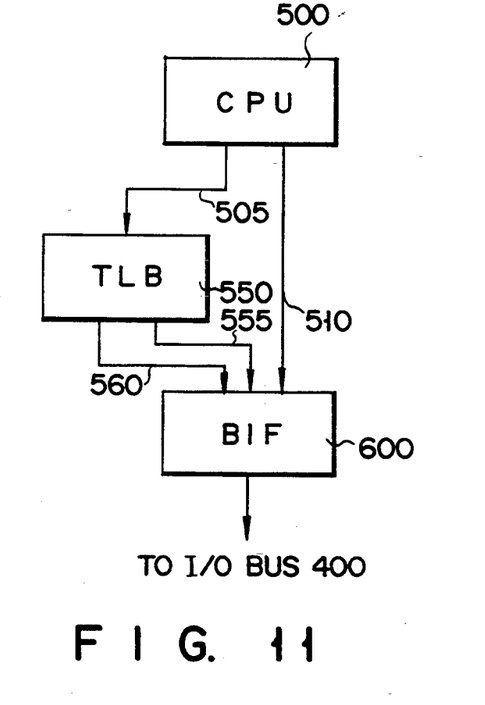
FIG. 11 is a schematic block diagram of a circuit for switching bus protocols in the multiprocessor system of FIG. 8.

FIG. 11 is a block diagram for a circuit to switch bus protocols in a multiprocessor system as shown in FIG. 8.

In FIG. 11, an CPU 500 sends a virtual address 505 to a TLB (address translation buffer) 550 when the processor accesses a particular page.

The TLB 550 transforms the virtual address 505 to a physical address 555 and then supplies it. The TLB 550, having a bit specifying a bus protocol, supplies a bus protocol specifying signal 560 according to the physical address 555.

The physical address 555 and bus protocol specifying signal 560 from the TLB 550 are transferred to a bus interface circuit 600.

Based on the data 510 from the CPU 500, the bus interface circuit 600 starts communication between the processors 410 or between the processor and I/O unit 420 in accordance with the protocol specified by the bus protocol specifying signal 560.

The operation of the embodiment constructed as in FIG. 11 will be explained.

When the processor accesses a particular page, the CPU 500 sends a virtual address 505 to the TLB 550. Then, the TLB 550 transforms the virtual address 505 to a physical address 555 and then supplies it to the bus interface circuit 600. According to the physical address 555 at that time, the TLB 550 supplies a bit specifying a bus protocol as a bus protocol specifying signal 560 to the bus interface circuit 600.

In this state, when the data 510 from the CPU 500 is supplied to the bus interface circuit 600, the bus interface circuit 600 starts communication between the processors 410 or between the processor and I/O unit 420 in accordance with the protocol specified by the bus protocol specifying signal 560.

With this approach, when one processor accesses a particular page, the bus protocol for that page can be specified by using the address at the time of accessing. Consequently, based on the protocol specified, in the address data multiplex mode or address data non-multiplex mode can be realized on the same system.

Figure 12:
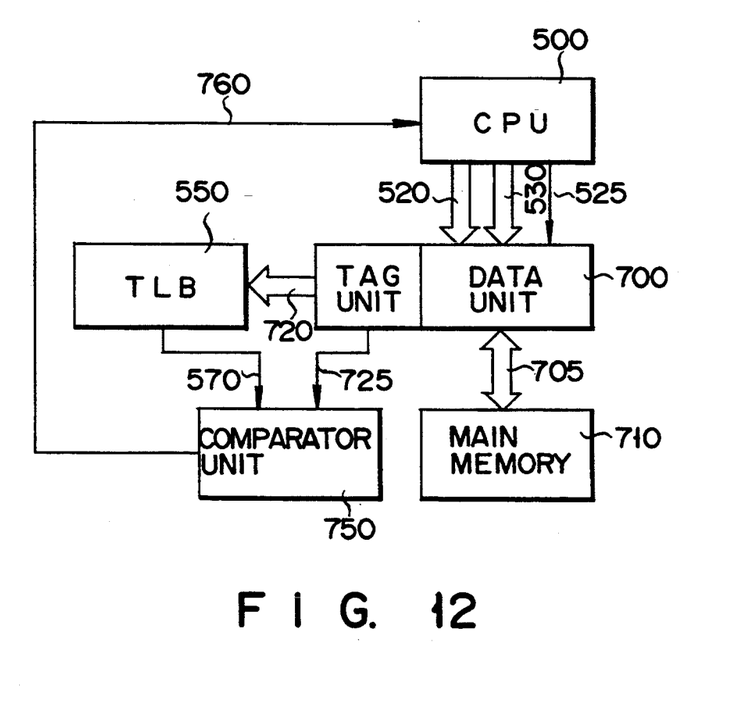
FIG. 12 is a block diagram for a copy back virtual cache system capable of rewriting the TLB dirty page bit according to a third embodiment, associated with the third object, of the present invention.

FIG. 12 shows a copy-back virtual cache system according to a third embodiment, associated with the third object, of the present invention. The system enables the rewriting of the TLB dirty page bit.

In FIG. 12, the virtual cache system contains a CPU 500, a cache memory consisting of a data unit 700A and a tag unit 700B, a TLB 550, a main memory 710, and a comparator 750.

To write data in the cache memory 700, the CPU 500 specifies the data unit 700A of the cache memory 700 by the address 520 and then writes data 530 in the data unit 700A. At the same time, it asserts the dirty bit of the tag unit 700B of the cache memory 700.

In copying back data 530 from the CPU 500, the copied back data is transferred from the data unit 700A of the cache memory 700 via the data bus 705 to the main memory 710. Here, the address in the main memory 710 is obtained from the TLB 550 on the basis of the virtual address 720 of the copied-back data. That is, the dirty bit 570 for the page containing data 530 is read from the TLB 550 and supplied to the comparator 750.

The comparator 750 compares the dirty page bit 750 with the dirty bit 725 of the tag unit 700B of the cache memory 700. In this case, when the dirty page bit 570 of the TLB 550 is negated and the dirty bit 725 of the tag unit 700B is asserted, the trap signal line 760 will be asserted and control of the CPU 500 jumps to the trap destination address.

The trap handling routine to jump to a trap address is executed as follows:

(1) Judge whether or not the cause of the trap lies in the TLB dirty page bit. In this case, a trap cause register is provided as a means of judgment. When a trap occurs, hardware loads the cause information into the trap cause register, and based on the contents of the register, control jumps to a different address by cause.

(2) Execute an instruction to search for the TLB 550 entry containing the mapping of the page at the register that holds the virtual address, process number, and global bit of the copied-back cache line.

(3) Rewrite the dirty page bit for the TLB 550 entry.

In the case of uncache write access, data 530 from the CPU 500 is written directly into the main memory 710 at the timing of the write signal 760. In this case, the TLB 550 is searched under address 520 from the CPU 500. If the dirty page bit 570 of the TLB 550 has not been asserted yet, the comparator 750 asserts the trap signal line 760, which is then trapped.

With this method, instead of causing hardware mechanism to rewrite the dirty page bit of the TLB 550, causing trap allows a trap handling routine to do the same thing by a TLB rewrite instruction. This simplifies the hardware mechanism, makes LSI chip size smaller, and shortens LSI chip development time.

The present invention is not limited to the above embodiments and may be practiced or embodied in still other ways without departing from the spirit or the essential character thereof.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An electronic computer capable of executing a plurality of instructions simultaneously, comprising:
 abort condition synthesizing means for judging whether each of a plurality of instructions is one of a delayed branch instruction and a squash branch instruction, and based on the results, producing a flag indicating an abort condition for each instruction; and command execute abort means for aborting execution of each of said instructions on the basis of said flag and whether a branch instruction is completed.

2. An electronic computer capable of executing a plurality of instructions simultaneously, comprising:

fetching means for accessing an instruction cache memory to fetch a plurality of instructions;

latching means for latching the output of said fetching means;

an instruction supplying means for receiving the latched instructions from said latching means;

abort condition synthesizing means for judging whether each of a plurality of instructions is one of a delayed branch instruction and a squash branch instruction, and based on the results, producing a flag indicating an abort condition for each instruction; and a plurality of executing means for receiving the instructions from said instruction supplying means and said flags from said abort condition synthesizing means and performing processes according to said instructions, one of said executing means being a branched executing means and including instruction execute abort means for aborting execution of each of said instructions on the basis of said flag and whether a branch instruction is completed.

3. An electronic computer capable of executing a plurality of instructions simultaneously, comprising:

fetching means for accessing an instruction cache memory to fetch a plurality of instructions;

latching means for latching the output of said fetching means;

an instruction supplying means for receiving the latched instructions from said latching means;

abort condition synthesizing means for judging whether each of a plurality of instructions is one of a delayed branch instruction and a squash branch instruction, and based on the results, producing a flag indicating an abort condition for each instruction; and a plurality of executing means for receiving the instructions from said instruction supplying means and said flags from said abort condition synthesizing means and performing processes according to said instructions, each of said executing means including instruction execute abort means for aborting execution of each of said instructions on the basis of said flag and whether a branch instruction is completed.

4. An electronic computer according to claim 3, wherein said abort condition synthesizing means includes:

a branch instruction decoder for decoding the instructions from said latching means to judge whether each of the instructions is any of a delayed branch instruction, a squash branch instruction, and other instructions;

a plurality of condition abort synthesizing means for receiving the instructions from said branch instruction decoders, and based on said instructions, producing abort conditions for the instructions including a branch instruction, each of said condition abort synthesizing means treating four instructions one instruction unit and sequentially producing the abort condition for each of said instructions by said instruction means; and a plurality of multiplexers selectively connected to the output of each of said condition abort synthesizing means, which supply a condition abort signal to said command execute abort means according to the signals from each of said condition abort synthesizing means and said latching means.

5. An electronic computer according to claim 3, wherein one of said executing means is a branch executing means.

6. An electronic computer according to claim 3, wherein said executing means further includes:

a decoder for decoding the instructions from said command supplying unit;

a register file for storing the output of said abort condition synthesizing means; and an arithmetic means for performing calculation according to the contents of said register file.

7. An electronic computer according to claim 1, wherein said instruction execute abort means includes:

abort decision circuits arranged so as to correspond to individual stages of said executing means, which make an abort decision on the basis of the stage condition abort signal corresponding to each of said stages and the branch-taken signal indicating whether to branch;

a plurality of AND circuits arranged so as to correspond to said abort decision circuits, selectively in each stage, each AND circuit having two input terminals one of which is connected to the output of said abort decision circuit; and a plurality of latches for latching the output of each of said AND circuits.

* * * * *

UNITED STATES PATENT AND TRADEMARK OFFICE
CERTIFICATE OF CORRECTION

PATENT NO.   :   5,446,849
DATED        :   AUGUST 29, 1995
INVENTOR(S)  :   Kenji MINAGAWA et al.

It is certified that error appears in the above-indentified patent and that said Letters Patent is hereby corrected as shown below:

IN THE DRAWINGS, Sheet 4 of 7, Figs. 4 and 5, change "COMMAND" to --INSTRUCTION-- (each occurrence)

Signed and Sealed this

Nineteenth Day of March, 1996

Attest:

BRUCE LEHMAN

*Attesting Officer*        *Commissioner of Patents and Trademarks*